United States Patent
Piciotti et al.

(10) Patent No.: US 7,275,557 B2
(45) Date of Patent: Oct. 2, 2007

(54) METHOD FOR THE PRODUCTION OF AN ELECTRONICALLY CONTROLLED BUTTERFLY VALVE WITH AN INDUCTIVE SENSOR OF "CONTACT-FREE" TYPE FOR AN INTERNAL COMBUSTION ENGINE

(75) Inventors: Roberto Piciotti, Bologna (IT); Claudio Fauni, Bologna (IT); Roberto Saporiti, Rome (IT)

(73) Assignee: Magneti Marelli Powertrain, S.p.A., Corbetta (IT)

( * ) Notice: Subject to any disclaimer, the term of this patent is extended or adjusted under 35 U.S.C. 154(b) by 281 days.

(21) Appl. No.: 10/939,968

(22) Filed: Sep. 14, 2004

(65) Prior Publication Data
US 2005/0092955 A1 May 5, 2005

(30) Foreign Application Priority Data
Sep. 15, 2003 (IT) .......................... BO2003A0532

(51) Int. Cl.
*F16K 1/22* (2006.01)
(52) U.S. Cl. .................................... 137/15.25; 123/399
(58) Field of Classification Search ........ 251/305–308; 137/15.25; 123/361, 396, 397, 399
See application file for complete search history.

(56) References Cited

U.S. PATENT DOCUMENTS

| | | | |
|---|---|---|---|
| 5,659,389 A | 8/1997 | Hieb et al. | |
| 5,868,114 A * | 2/1999 | Kamimura et al. | 251/129.11 |
| 6,236,199 B1 | 5/2001 | Irle et al. | |
| 6,244,565 B1 * | 6/2001 | McDonnell et al. | 251/305 |
| 6,267,352 B1 * | 7/2001 | Semeyn et al. | 251/129.12 |
| 6,286,481 B1 * | 9/2001 | Bos et al. | 123/396 |
| 6,390,062 B1 * | 5/2002 | Saito et al. | 123/399 |
| 6,683,429 B2 * | 1/2004 | Pringle et al. | 251/129.11 |
| 6,691,678 B1 * | 2/2004 | Hashimoto et al. | 251/305 |
| 6,932,051 B2 * | 8/2005 | Soshino et al. | 123/337 |
| 2003/0024505 A1 | 2/2003 | Anschicks et al. | |

FOREIGN PATENT DOCUMENTS

JP          2004-3421     * 1/2004

* cited by examiner

*Primary Examiner*—John Bastianelli
(74) *Attorney, Agent, or Firm*—Jacobson Holman PLLC

(57) ABSTRACT

A method for the production of a butterfly valve which comprises a valve body housing a valve seat engaged by a butterfly disc keyed on a shaft in order to rotate under the action of an electric motor, the shaft being coupled to an inductive position sensor of the "contact-free" type provided with a rotor which is rigid with the shaft and is housed in a chamber of the valve body, and a stator which is borne by a detachable cover adapted to close the chamber and is disposed, in operation, facing the rotor, the method comprising the coupling of the rotor to the shaft, the mounting of the stator on the cover, the completion of any remaining machining operations on the butterfly valve, the coupling of the cover to the valve body in order to close the chamber in a substantially permanent manner, and the calibration of the position sensor by disposing the shaft in a sequence of predetermined positions.

18 Claims, 5 Drawing Sheets

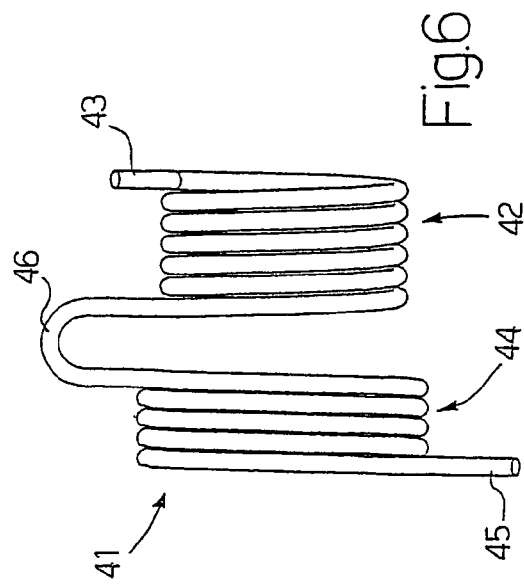
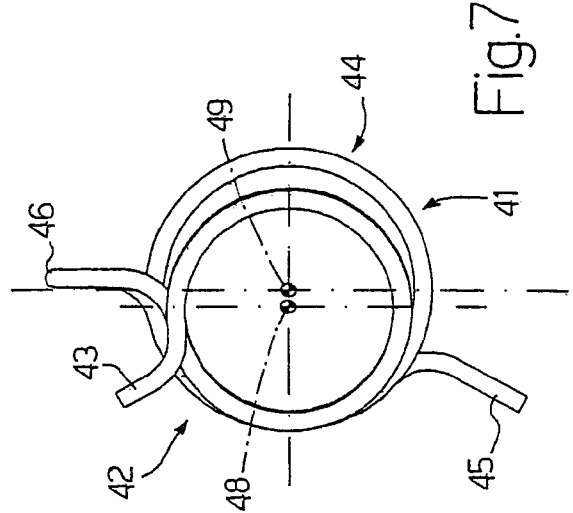
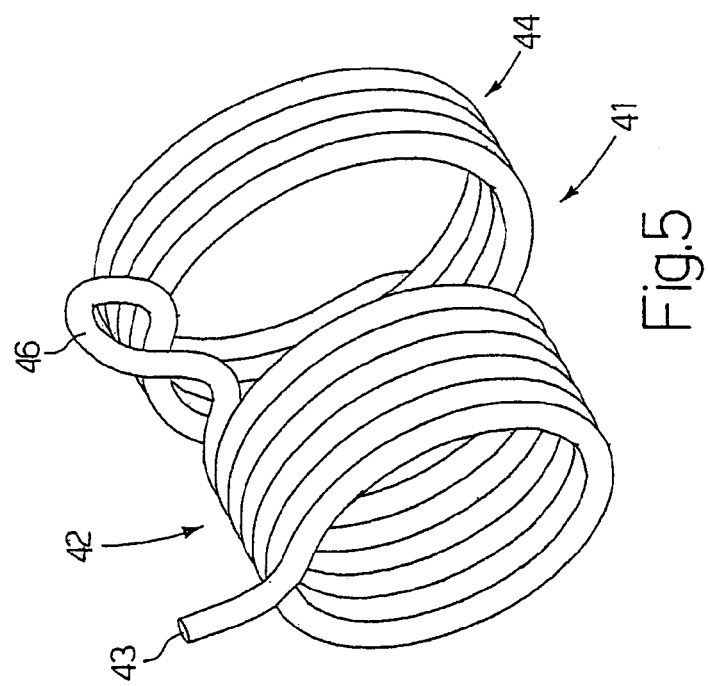

METHOD FOR THE PRODUCTION OF AN ELECTRONICALLY CONTROLLED BUTTERFLY VALVE WITH AN INDUCTIVE SENSOR OF "CONTACT-FREE" TYPE FOR AN INTERNAL COMBUSTION ENGINE

The present invention relates to a method for the production of an electronically controlled butterfly valve with an inductive sensor of the "contact-free" type for an internal combustion engine.

BACKGROUND OF THE INVENTION

Petrol driven internal combustion engines are normally provided with a butterfly valve which regulates the flow of air supplied to the cylinders. Typically, the butterfly valve comprises a valve body housing a valve seat engaged by a butterfly disc which is keyed on a shaft in order to rotate between an open position and a closed position under the action of an electric motor connected to this shaft by means of a gear transmission. The shaft bearing the butterfly valve is associated with a position sensor which is adapted to detect the angular position of the shaft and therefore of the butterfly valve in order to enable a control unit to control, by feedback, the electric motor which determines the position of the butterfly valve.

The position sensor comprises a rotor which is mounted on the shaft and a stator which, in operation, faces the rotor and is adapted to detect the angular position of this rotor; the position sensor may of the "contact" type (typically formed by a potentiometer), i.e. there is a mechanical connection between the rotor and the stator, or of the "contact-free" type, i.e. there is no mechanical connection between the rotor and the stator of the position sensor. An embodiment of an inductive position sensor of a "contact-free" type normally used to detect the angular position of the shaft of an electronically controlled butterfly valve is disclosed in U.S. Pat. No. 6,236,199-B1.

The use of inductive position sensors of the "contact-free" type to detect the angular position of the shaft of an electronically controlled butterfly valve has recently been preferred as this type of sensor should ensure greater precision, higher speeds of reading and, in particular, a reading precision which is constant over time in comparison with the sensors of the "contact" type based on potentiometers widely used in the past. In some cases it has been observed, however, that once the production of the butterfly valve is complete, the performance of the inductive position sensor is substantially below its nominal performance, even though the position sensor is free from evident constructional defects.

SUMMARY OF THE INVENTION

The object of the present invention is to provide a method for the production of an electronically controlled butterfly valve with an inductive sensor of the "contact-free" type for an internal combustion engine which is free from the drawbacks described above and which is, in particular, easy and economic to embody.

The present invention therefore relates to a method for the production of a butterfly valve comprising a valve body housing a valve seat engaged by a butterfly disc keyed on a shaft in order to rotate under the action of an electric motor, the shaft being coupled to an inductive position sensor of the "contact-free" type provided with a rotor which is rigid with the shaft and is housed in a chamber of the valve body, and a stator which is borne by a detachable cover adapted to close the chamber and is disposed, in operation, facing the rotor, the method being characterised in that it comprises the stages of coupling the rotor to the shaft, mounting the stator on the cover, completing any remaining machining operations on the butterfly valve, coupling the cover to the valve body in order to close the chamber in a substantially permanent manner, and carrying out a calibration of the position sensor by disposing the shaft in a sequence of predetermined positions.

BRIEF DESCRIPTION OF THE DRAWINGS

The present invention is described below with reference to the accompanying drawings which show a non-limiting embodiment thereof, and in which:

FIG. 5 is a perspective view of a double spring of the butterfly valve of FIG. 1;

FIG. 6 is a side view of the double spring of FIG. 5;

FIG. 7 is a front view of the double spring of FIG. 5.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
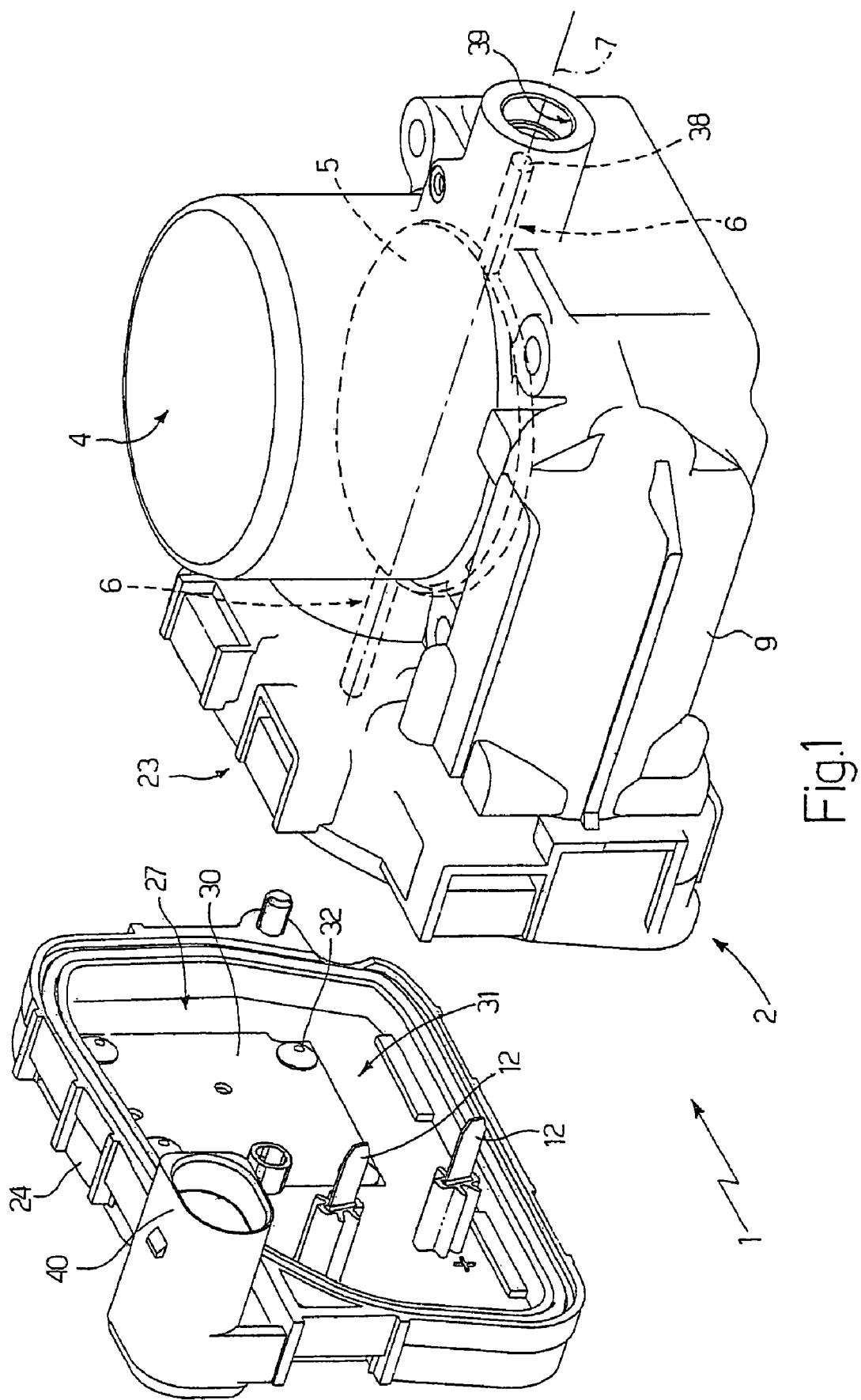
FIG. 1 is a perspective view, partially exploded and with some parts removed for clarity, of an electronically controlled butterfly valve produced in accordance with the method of the present invention.

In FIG. 1, an electronically controlled butterfly valve for an internal combustion engine (not shown) is shown overall by 1; the butterfly valve 1 comprises a metal valve body 2 housing an electric motor 3 (shown in FIG. 2), a valve seat 4 and a butterfly disc 5 (shown diagrammatically in dashed lines) which engages the valve seat 4 and is displaced between an open position and a closed position under the action of the electric motor 3. The butterfly disc 5 is keyed on a metal shaft 6 having a longitudinal axis 7 in order to rotate between the open position and the closed position under the action of the electric motor 3 connected to this shaft 6 by means of a gear transmission 8 (shown in FIG. 2).

Figure 2:
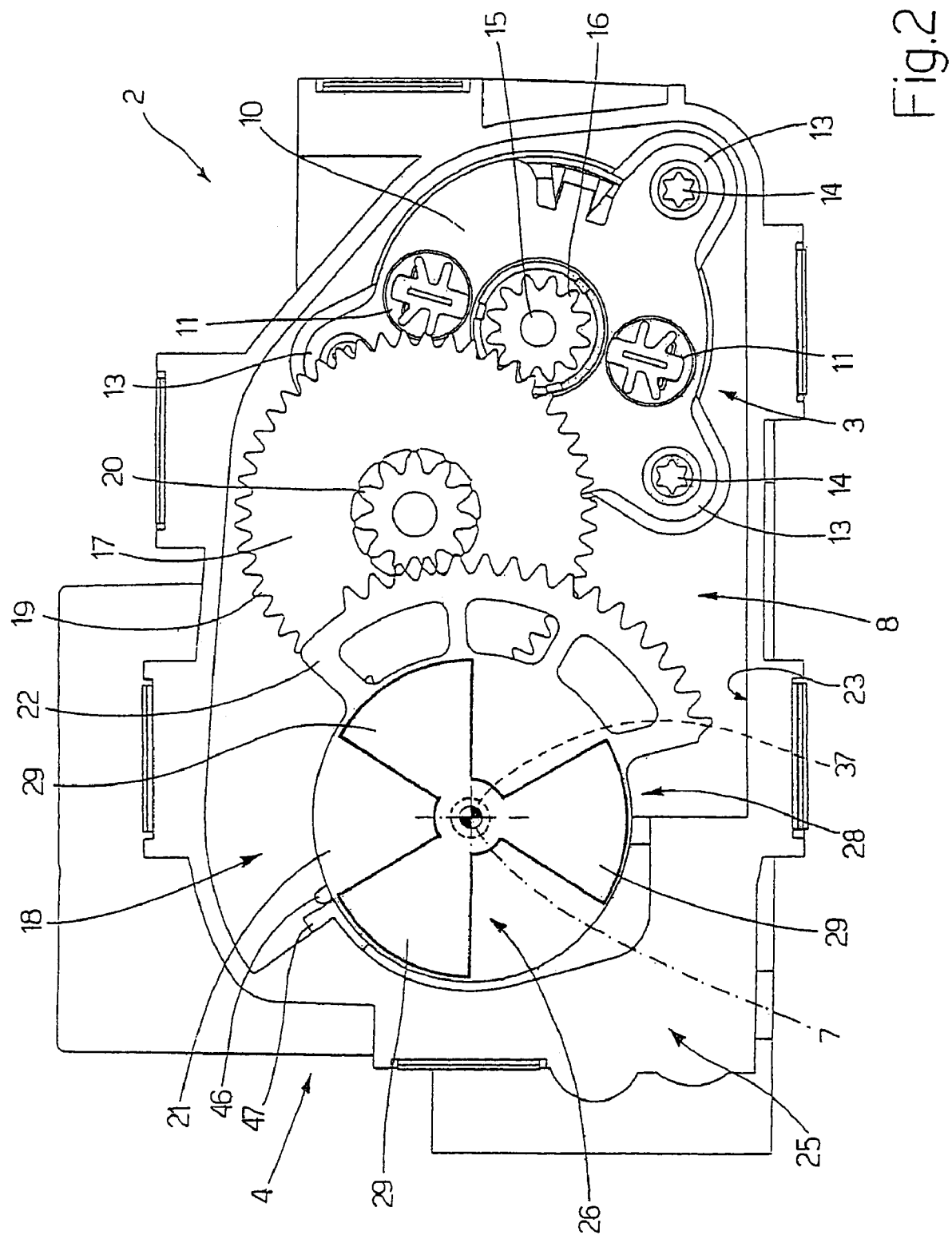
FIG. 2 is a front, diagrammatic view of a chamber of a valve body of the butterfly valve of FIG. 1.
Figure 3:
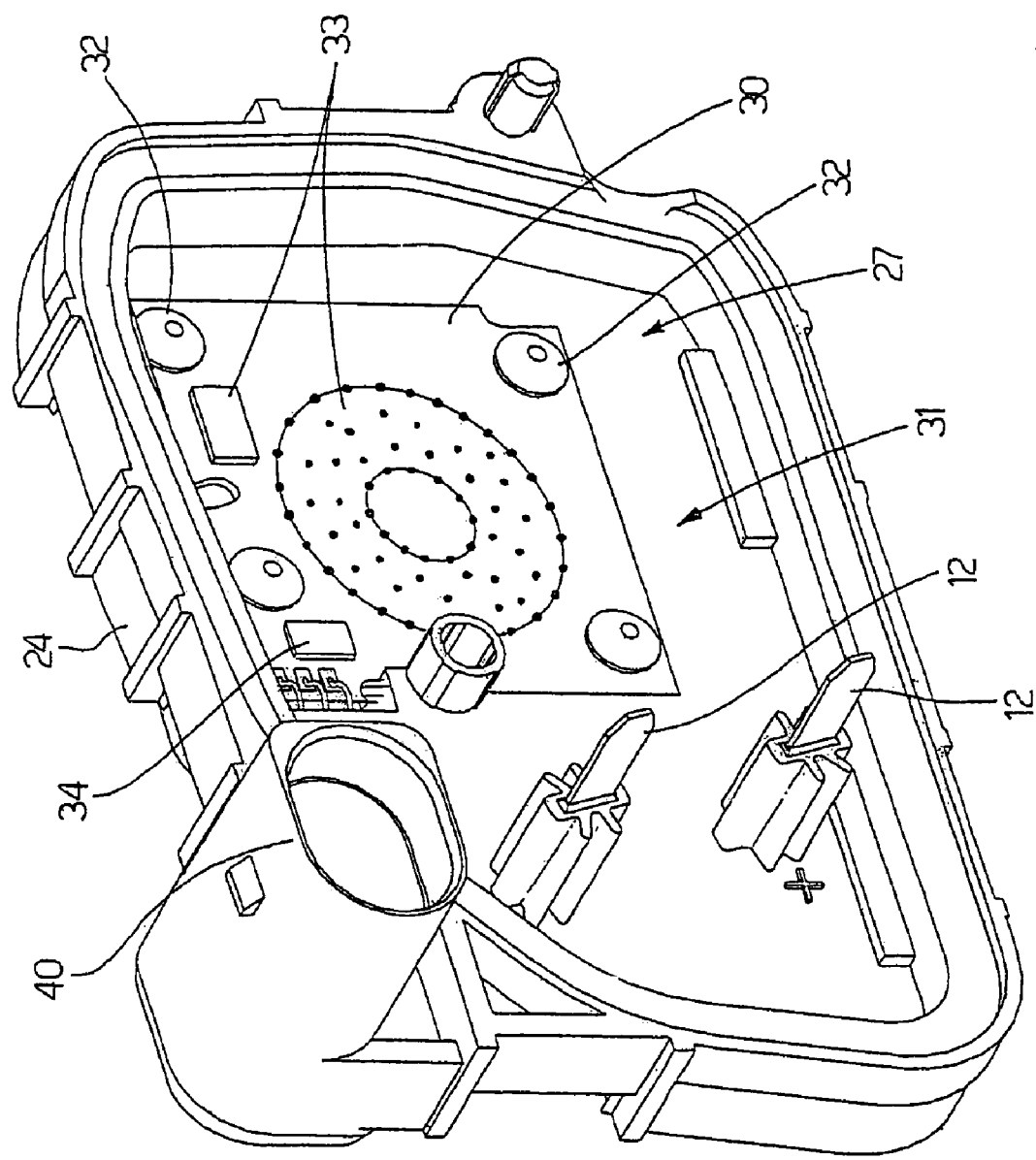
FIG. 3 is a perspective, diagrammatic view of a cover for the closure of the chamber of FIG. 2.
Figure 4:
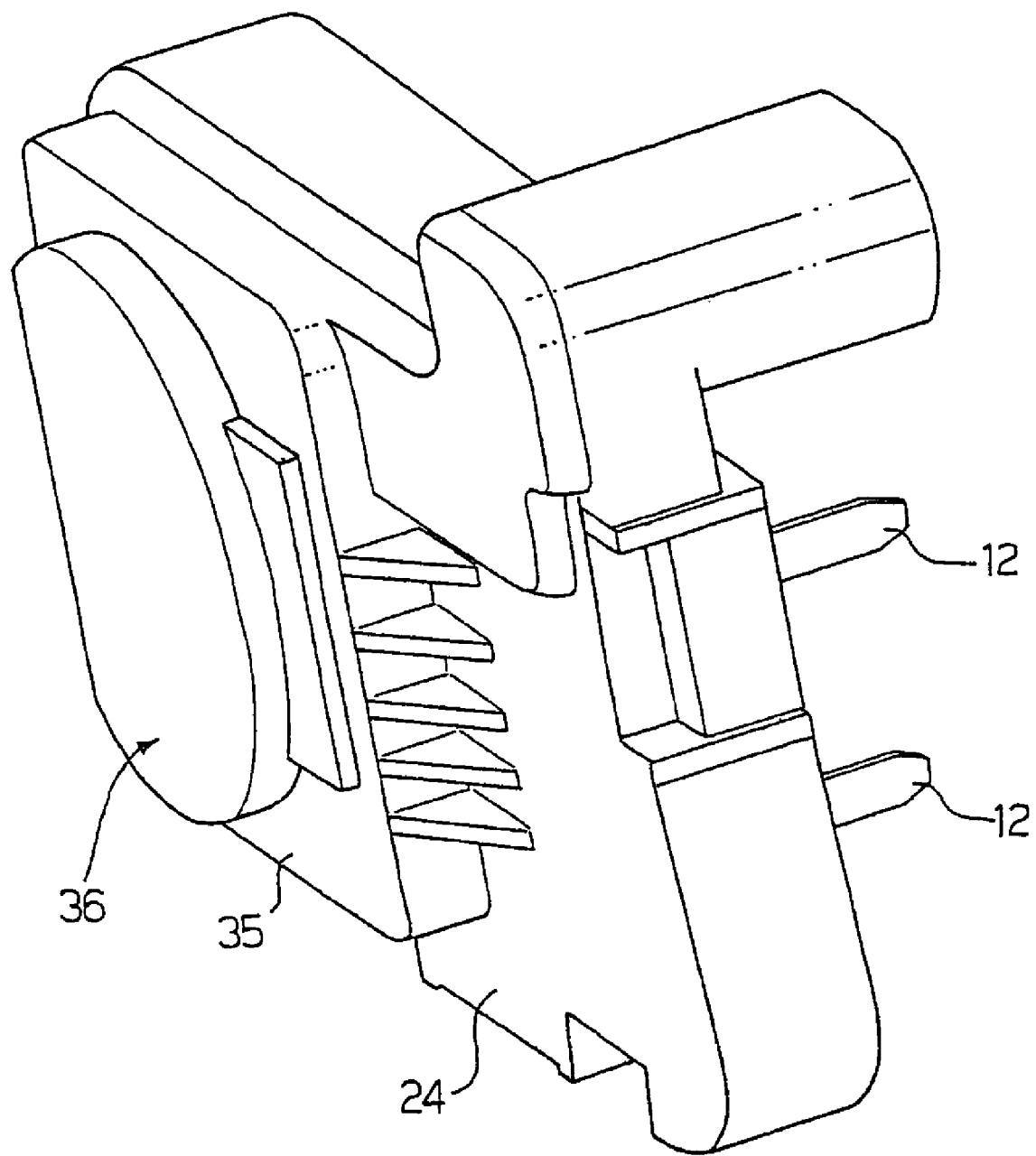
FIG. 4 is a further perspective view of the cover of FIG. 3.

As shown in FIG. 2, the electric motor 3 has a cylindrical body which is disposed in a tubular housing 9 (shown in FIG. 1) disposed alongside the valve seat 4 and is held in a predetermined position within the tubular housing 9 by a metal plate 10; the metal plate 10 comprises a pair of female electrical connectors 11 which are electrically connected to the electric motor 3 and are adapted to be engaged by a pair of respective male electrical connectors 12 (shown in FIGS. 1 and 3). In order to ensure that the electric motor 3 is correctly secured to the valve body 2, the plate 10 has three radial drilled projections 13 via which respective screws 14 for fastening to the valve body 2 are inserted.

The electric motor 3 comprises a shaft 15 ending in a toothed wheel 16 which is mechanically connected to the shaft 6 by means of an idle toothed wheel 17 interposed between the toothed wheel 16 and a final gear 18 keyed on the shaft 6. The toothed wheel 17 comprises a first set of teeth 19 coupled to the toothed wheel 16 and a second set of teeth 20 coupled to the final gear 18; the diameter of the first set of teeth 19 differs from the diameter of the second set of teeth 20 with the result that the toothed wheel 17 has a transmission ratio which is not unitary. The final gear 18 is formed by a solid central cylindrical body 21 keyed on the shaft 6 and provided with a circular crown portion 22 provided with a set of teeth coupled to the toothed wheel 18. The whole gear transmission 8, i.e. the toothed wheel 16, the toothed wheel 17 and the final gear 18 are normally made from plastics material.

The gear transmission 8 and the plate 10 are disposed in a chamber 23 of the valve body 2 which is closed by a detachable cover 24 (shown in FIGS. 1 and 3) made from plastics material.

As shown in FIGS. 2 and 3, the butterfly valve 1 comprises an inductive position sensor 25 of the "contact-free" type which is coupled to the shaft 6 and is adapted to detect the angular position of the shaft 6 and, therefore, of the butterfly disc 5 in order to enable the control, in feedback, of the position of this butterfly disc 5. The position sensor 25 is of the type disclosed in U.S. Pat. No. 6,236,199-B1 and comprises a rotor 26 rigid with the shaft 6 and a stator 27 borne by the cover 24 and disposed in operation to face the rotor 26; the rotor 26 is formed by a plane metal winding 28 which is closed in short-circuit, comprises a series of lobes 29 and is embedded in the central cylindrical body 21 of the final gear 18. The metal winding 28 is preferably partially embedded in the central cylindrical body 21 of the final gear 18 so that a surface of the winding 28 facing the stator 27 is substantially coplanar with an outer surface of the cylindrical body 21. According to a different embodiment (not shown), the metal winding 28 is completely embedded in the central cylindrical body 21 of the final gear 18.

The stator 27 of the position sensor 25 comprises a support base 30 which is connected to an inner wall 31 of the cover 24 by means of four plastic rivets 32. The support base 30 bears a reading device 33 which is adapted to supply a reading signal depending on the position of the rotor 26, and a filter device 34 adapted to linearise the reading signal supplied by the reading device 33. The filter device 34 in particular comprises a memory which, for each value of the reading signal, stores a corresponding linearised value. According to a preferred embodiment, the stator 27 of the position sensor 25 is provided with a pair of reading devices 33 and a pair of respective filter devices 34; the reading signals from the two reading devices 33 show variations of opposite sign following the movement of the rotor 26 of the position sensor 25 such that the sum of the reading signals of the two reading devices 33 is constant.

At the location of the stator 27 of the position sensor 25, the cover 24 has a dished portion 35 adapted to space the stator 27 by at least 8-10 mm from the outer surface 35 of this cover 24; the spacing of the stator 27 from the outer surface 35 is adapted to ensure that, after mounting of the butterfly valve 1 in a respective internal combustion engine (not shown), any metal bodies can in no case, whether accidentally or not, be positioned in a position so close to the sensor 27 as to cause disturbances of the reading of the position of the rotor 26.

According to a preferred embodiment, an end 37 of the shaft 6 is disposed inside the chamber 23 and is coupled to the rotor 26 of the position sensor 25 and an end 38 of the shaft 6 opposite the end 37 is disposed in a cylindrical channel 39 of the valve body 2 accessible from outside this valve body 2; the end 38 of the shaft 6 is shaped to enable a mechanical coupling with a further shaft of an external calibration actuator (not shown) so as to make it possible to dispose the shaft 6, and therefore the butterfly disc 5, in a sequence of predetermined positions without using the electric motor 3.

During the production of the butterfly valve 1, the rotor 26 of the position sensor 25 is coupled to the shaft 6, the stator 27 of the position sensor 25 is mounted on the cover 24, any remaining machining of the butterfly valve 1 is completed, and the cover 24 is lastly coupled to the valve body 2 to close the chamber 23 in a substantially permanent manner, i.e. the cover 24 is removed from the chamber 23 only in the case of defects or malfunctions of the butterfly valve 1. When the cover 24 is coupled to the valve body 2, the male electrical connectors 12 borne by the cover 24 are inserted in the respective female electrical connectors 11 electrically connected to the electric motor 3.

Once the cover 24 is coupled to the valve body 2 to close the chamber 23 in a substantially permanent manner, a calibration of the position sensor 25 is carried out as the last operation by disposing the shaft 6 in a sequence of predetermined positions by means of an external calibration actuator (not shown). The calibration phase of the position sensor 25 comprises setting of the filter device 34 by writing the content of the memory of this filter device 34; in other words, when the shaft 6 is disposed by the external actuator (not shown) in a predetermined position, the content of the memory of the filter device 34 is written such that the linearised reading signal is equal to a predetermined value known in advance and corresponding to the predetermined position of the shaft 6.

According to a preferred embodiment shown in the accompanying drawings, the cover 24 is provided with a female electrical connector 40 which comprises a series of six electrical contacts (not shown in detail): two electrical contacts are connected to the male electrical connectors 12 adapted to supply the electric motor 3, while the other four electrical contacts are connected to the stator 27 of the position sensor 25 and are intended for the supply voltage, the electrical earth and the two linearised reading signals from the two reading devices 33. When the cover 24 is disposed in contact with the valve body 2 to close the chamber 23, the female electrical connector 40 is disposed above the tubular housing 9 of the electric motor 3. It should be noted that all the electrical connections needed for the operation of the butterfly valve 1 lead to the female electrical connector 40 with the result that the female electrical connector 40 is the sole point of electrical connection between the butterfly valve 1 and the electronic control unit (not shown) of the engine.

The coupling of the cover 24 to the valve body 2 to close the chamber 23 also makes the electrical connection between the electric motor 3 and the female electrical connector 40 since the male electrical connectors 12 borne by the cover 24 are inserted into the respective female electrical connectors 11 electrically connected to the electric motor 3 when the cover 24 is coupled to the valve body 2.

Various experimental tests have shown that calibrating the position sensor 25 once the cover 24 is coupled to the valve body 2 in a permanent manner makes it possible substantially always to ensure that the actual performance of the position sensor 25 is in keeping with the nominal performance of this position sensor 25; this result is due to the fact that the calibration of the position sensor 25 once the cover 24 is coupled to the valve body 2 in a permanent manner offsets all the tolerances which may be generated with respect to the position sensor 25 during the assembly of the butterfly valve 1.

According to a preferred embodiment shown in detail in FIGS. 5, 6 and 7, the shaft 6 is coupled to a double spring 41 which has a front preloaded spring 42 provided with a first projection 43 connected mechanically to the toothed wheel 18 (and therefore to the shaft 6) and a rear preloaded spring 44 provided with a projection 45 mechanically connected to the valve body 2. The front spring 42 and the rear spring 44 are connected together by an arc member 46 which, in operation, normally bears in abutment against an abutment body 47.

The front spring 42 tends to rotate the shaft 6 in a clockwise direction with a movement which tends to bring the butterfly disc 5 into a closed position, while the rear spring 44 tends to rotate the shaft 6 in an anti-clockwise direction with a movement which tends to bring the butterfly disc 5 into an open position; the front spring 42 generates an elastic torque lower than the elastic torque generated by the rear spring 44, with the result that, overall, the double spring 41 tends to rotate the shaft 6 in the anti-clockwise direction into an open position. The anti-clockwise rotation (i.e. towards an open position) of the shaft 6 under the action of the double spring 41 is blocked by the presence of the abutment body 47 which forms an abutment surface against which the arc member 46 stops; in this way, in the absence of the action of the electric motor 3, the double spring 41 brings the shaft 6 (and therefore the butterfly disc 5) into a partially open or limp-home position.

When the electric motor 3 is actuated, the drive torque generated by the electric motor 3 is able to rotate the shaft 6 (and therefore the butterfly disc 5) into a completely closed position against the elastic torque generated by the rear spring 44 and is able to rotate the shaft 6 (and therefore the butterfly disc 5) into a completely open position against the elastic torque generated by the front spring 42.

As shown in FIG. 7, the front spring 42 has a smaller diameter than the rear spring 44 and, in rest conditions, i.e. when the double spring 41 is not inserted in the valve body 2, the front spring 42 is not coaxial with the rear spring 44; in other words, when the double spring 41 is not subject to external action, the axis 48 of the front spring 42 is not aligned with the axis 49 of the rear spring 44. The eccentricity of the front spring 42 with respect to the rear spring 44 is calculated such that once the double spring 41 is inserted as described above in the valve body 2, this eccentricity is cancelled out and the axis 48 of the front spring 42 is aligned with the axis 49 of the rear spring 44; in other words, the mechanical action exerted on the double spring 41 when it is inserted in the valve body 2 to preload the front spring 42 and the rear spring 44 entails deformations of the double spring 41 which cancel out the eccentricity between the front spring 42 and the rear spring 44.

The fact of ensuring in operation, i.e. when the double spring 41 is inserted in the valve body 2, that the front spring 42 and the rear spring 44 are coaxial with one another ensures optimum working conditions for the double spring 41, as it ensures the prevention of any friction between the front spring 42 and/or the rear spring 44 and the inner walls of the valve body 2. Experimental tests have in practice shown that if the front spring 42 and the rear spring 44 are coaxial with one another in rest conditions, then the front spring 42 and the rear spring 44 are eccentric with respect to one another once the valve body 2 is mounted with the possible occurrence of friction between the front spring 42 and/or the rear spring 44 and the inner walls of the valve body 2.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. A method for the production of a butterfly valve having a valve body housing a valve seat engaged by a butterfly disc keyed on a shaft in order to rotate under the action of an electric motor, the shaft being coupled to a contact-free inductive position sensor provided with a rotor which is rigid with the shaft and is housed in a chamber of the valve body, and a stator which is borne by a detachable cover adapted to close the chamber and is disposed, in operation, facing the rotor, the method comprising the steps of:
   coupling a first end of the shaft, which is disposed within the chamber, to the rotor of the position sensor, a second end of the shaft opposite the first end being disposed in a cylindrical channel of the valve body accessible from outside the valve body;
   mounting the stator on the cover;
   completing any remaining machining operations on the butterfly valve;
   coupling the cover to the valve body in order to close the chamber in a substantially permanent manner; and
   carrying out a calibration of the position sensor with an external calibration actuator coupled to the shaft in order to dispose said shaft in a sequence of predetermined positions across the second end of the shaft.

2. The method as claimed in claim 1, wherein the second end of the shaft is shaped so as to enable a mechanical coupling with a further shaft of the external calibration actuator.

3. The method as claimed in claim 1, wherein the stator of the position sensor is provided with at least one reading device adapted to supply a reading signal depending on the position of the rotor, and a filter device adapted to linearise the reading signal supplied by the reading device, the calibration stage of the position sensor including setting of the filter device.

4. The method as claimed in claim 3, wherein the filter device includes a memory which, for each value of the reading signal, stores a corresponding linearised value, the calibration stage of the position sensor including writing of the content of the memory of the filter device.

5. The method as claimed in claim 3, wherein the stator of the position sensor is provided with a further reading device adapted to supply a reading signal depending on the position of the rotor, and a further filter device adapted to linearise the reading signal supplied by the further reading device, the reading signals from the two reading devices showing variations of opposite sign following the movement of the rotor of the position sensor such that the sum of the reading signals of the two reading devices is constant.

6. The method as claimed in claim 1, wherein the electric motor is coupled to the shaft by a gear transmission which is housed within the chamber and ends in a final gear keyed on the shaft and bearing the rotor of the position sensor.

7. The method as claimed in claim 6, wherein the rotor of the position sensor includes a plane metal winding which is closed in short-circuit, has a series of lobes and is at least partly embedded in the final gear, the metal winding having a surface facing the stator of the position sensor, which surface is substantially coplanar with an outer surface of the final gear.

8. The method as claimed in claim 1, wherein the cover is made from plastics material and, at the location of the stator of the position sensor, includes a dished portion in order to space the stator by at least 8 mm from the outer surface of said cover.

9. The method as claimed in claim 1, wherein the cover is made from plastics material and, at the location of the stator of the position sensor, includes a dished portion in order to space the stator by at least 10 mm from the outer surface of said cover.

10. The method as claimed in claim 1, wherein the coupling of the cover to the valve body to close the chamber also makes the electrical connection between the electric motor and a female electrical connector which is borne by the cover and bears all the electrical connections needed for the operation of the butterfly valve.

11. The method as claimed in claim 10, wherein the electric motor includes a pair of female electrical connectors disposed in the chamber and the cover includes a pair of male electrical connectors which project from the cover and are inserted in the corresponding female electrical connectors of the electric motor when the cover is coupled to the valve body.

12. The method as claimed in claim 10, wherein the female electrical connector of the cover includes a set of six electrical contacts, two electrical contacts being connected to the male electrical connectors adapted to supply the electric motor, while the other four electrical contacts are connected to the stator of the position sensor.

13. A method for the production of a butterfly valve having a valve body housing a valve seat engaged by a butterfly disc keyed on a shaft in order to rotate under the action of an electric motor, the shaft being coupled to a contact-free inductive position sensor provided with a rotor which is rigid with the shaft and is housed in a chamber of the valve body, and a stator which is borne by a detachable cover adapted to close the chamber and is disposed, in operation, facing the rotor, the method comprising the steps of:
- coupling the rotor to the shaft;
- mounting the stator on the cover, said stator being provided with at least one reading device adapted to supply a reading signal depending on the position of the rotor, and a filter device adapted to linearise the reading signal supplied by the reading device;
- completing any remaining machining operations on the butterfly valve;
- coupling the cover to the valve body in order to close the chamber in a substantially permanent manner; and
- carrying out a calibration of the position sensor by setting the filter device and disposing the shaft in a sequence of predetermined positions.

14. The method as claimed in claim 13, wherein the filter device includes a memory which, for each value of the reading signal, stores a corresponding linearised value, the calibration stage of the position sensor including writing of the content of the memory of the filter device.

15. The method as claimed in claim 13, wherein the stator of the position sensor is provided with a further reading device adapted to supply a reading signal depending on the position of the rotor, and a further filter device adapted to linearise the reading signal supplied by the further reading device, the reading signals from the two reading devices showing variations of opposite sign following the movement of the rotor of the position sensor such that the sum of the reading signals of the two reading devices is constant.

16. The method as claimed in claim 13, wherein the electric motor is coupled to the shaft by a gear transmission which is housed within the chamber and ends in a final gear keyed on the shaft and bearing the rotor of the position sensor.

17. The method as claimed in claim 16, wherein the rotor of the position sensor includes a plane metal winding which is closed in short-circuit, has a series of lobes and is at least partly embedded in the final gear, the metal winding having a surface facing the stator of the position sensor, which surface is substantially coplanar with an outer surface of the final gear.

18. A method for the production of a butterfly valve having a valve body housing a valve seat engaged by a butterfly disc keyed on a shaft in order to rotate under the action of an electric motor, the shaft being coupled to a contact-free inductive position sensor provided with a rotor which is rigid with the shaft and is housed in a chamber of the valve body, and a stator which is borne by a detachable cover adapted to close the chamber and is disposed, in operation, facing the rotor, the method comprising the steps of:
- coupling the rotor to the shaft, the electric motor being coupled to the shaft by a gear transmission which is housed within the chamber and ends in a final gear keyed on the shaft and bearing the rotor of the position sensor, said rotor including a plane metal winding which is closed in short-circuit, has a series of lobes and is at least partly embedded in the final gear, the metal winding having a surface facing the stator of the position sensor which is substantially coplanar with an outer surface of the final gear;
- mounting the stator on the cover;
- completing any remaining machining operations on the butterfly valve;
- coupling the cover to the valve body in order to close the chamber in a substantially permanent manner; and
- carrying out a calibration of the position sensor by disposing the shaft in a sequence of predetermined positions.

* * * * *